No. 895,047. PATENTED AUG. 4, 1908.
F. SCHRAUDNER.
DEVICE FOR CLAMPING BAR HOOKS.
APPLICATION FILED FEB. 3, 1908.
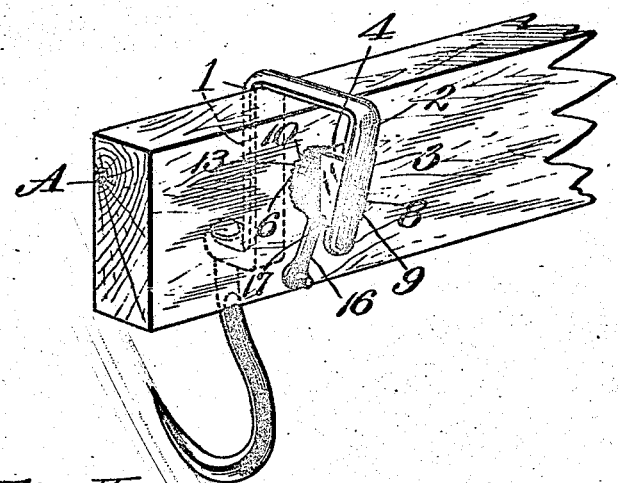
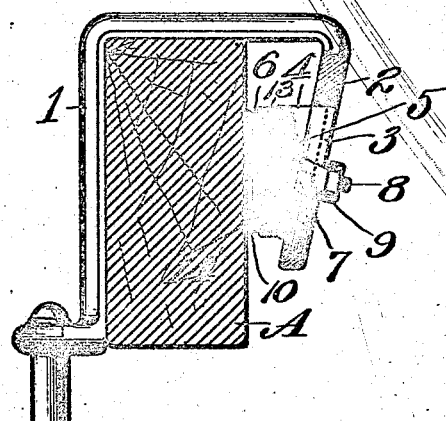
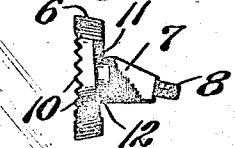
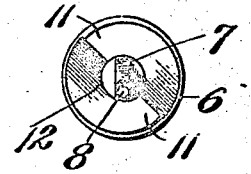
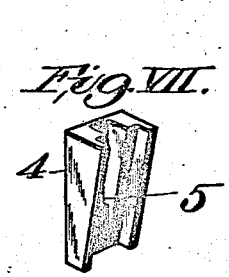
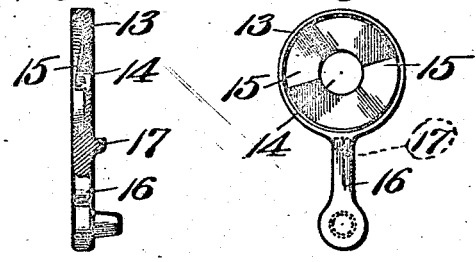
Attest:
W. Herth
Blanche Argau
Inventor:
F. Schraudner,
by Geo H Knight
Atty.

UNITED STATES PATENT OFFICE.

FREDERICK SCHRAUDNER, OF ST. LOUIS, MISSOURI, ASSIGNOR TO GUS V. BRECHT BUTCHER SUPPLY COMPANY, OF ST. LOUIS, MISSOURI.

DEVICE FOR CLAMPING-BAR HOOKS.

No. 895,047. Specification of Letters Patent. Patented Aug. 4, 1908.

Application filed February 3, 1908. Serial No. 414,026.

*To all whom it may concern:*

Be it known that I, FREDERICK SCHRAUDNER, a citizen of the United States of America, residing in the city of St. Louis and State of Missouri, have invented certain new and useful Improvements in Devices for Clamping-Bar Hooks, of which the following is a full, clear, ad exact description, reference being had to the accompanying drawing, forming part of this specification.

My invention relates to a hook for suspending objects of various kinds, and more particularly intended for use in hanging large pieces of dressed meats, such as "sides" and "quarters".

Hooks of the character described to which my invention more particularly relates, are usually employed upon racks containing pieces of timber of rectangular shape in cross section and these pieces of timber vary materially in thickness, so that plain hooks cannot be used satisfactorily in a universal manner upon various racks.

My invention has for its object the production of a hook having means connected therewith whereby the hook is rendered adjustable to fit supports of different dimensions.

Figure I is a perspective view of my hook shown applied to a support. Fig. II is in part an elevation and in part a vertical section of the hook shown applied to a support. Fig. III is a side elevation of the gripping member of the hook. Fig. IV is a rear elevation of the gripping member. Fig. V is in part a section and in part an edge elevation of the cam lever member of the hook. Fig. VI is a face view of the cam lever member. Fig. VII is a perspective view of the wedge shaped alining or bearing block.

In the accompanying drawings: A designates a support in the shape of a piece of timber to which my hook is shown applied.

1 designates the bow of the hook comprising a depending front arm, a cross arm and a depending back arm 2, the latter of which is inclined forwardly and downwardly relative to the front arm. In the back arm 2 is a slot 3 that extends vertically or longitudinally of said back arm. It will be seen that by making the back arm 2 of the bow of the hook inclined forwardly relative to the front arm of said bow, the lower end of the back arm 2 approaches gradually towards the front arm of the bow.

4 is a bearing block of wedge shape which fits against the inner face of the forwardly inclined back arm 2 and is preferably channeled as shown, in order that it will straddle the back arm so as to direct the movement of the bearing block when said bearing block is raised or lowered against the inner face of said back arm. The outer face of the bearing block which bears against the inner face of the back arm is tapered, as most clearly seen in Fig. VII, while the opposite or inner face of the bearing block affords a perpendicular bearing surface for a member to be hereinafter more particularly mentioned. At the transverse center of the bearing block 4 is a non-circular or oblong aperture 5.

6 designates a gripping member that is provided with a shank 7 of non-circular or oblong shape in cross section adapted to extend through the non-circular or oblong aperture in the bearing block 4 and the longitudinal slot 3 in the back arm 2. The shank 7 terminates in a screw threaded stem 8 that receives a nut 9 by which the shank is retained in the back arm 2. The body of the gripping member 6 is preferably in the shape of a disk having a forward face provided with serrations 10 or roughened in any desirable manner so that an efficient gripping surface will be presented toward the front arm of the hook bow 1. At the rear of the body of the binding member 6 is one or more cams 11 preferably produced directly upon said body, see Figs. III and IV. The inner portion of the gripping member shank 7 that is in immediate juxtaposition to the rear face of the body of the gripping member is cylindrical, as seen at 12, Figs. III and IV.

13 designates a lever member which is interposed between the bearing block 4 and the body of the gripping member 6, and is provided with a circular aperture 14 in which the cylindrical inner portion 12 of the gripping member shank 7 seats and on which the lever member is rotated. The outer face of the lever member 13 is flat and fits against the inner perpendicular face of the bearing block 4, while the inner face of said lever member is provided with one or more cams 15 that oppose and are adapted to coöperate with the cam or cams at the rear face of the gripping member 6. The lever member 13 is provided with a handle arm 16 by which the lever member may be rotated and it is also provided with a stop stud 17 that is adapted to strike against the bearing block 4 for the purpose of limiting the degree of rotation of said lever member when the hook is not applied to a support, thereby keeping the handle arm of the lever member at the proper side of the hook in order that when it is grasped and moved, the lever member may be properly rotated for action upon the gripping member 6.

When my hook is to be applied to a support, such for instance, as that illustrated in Figs. I and II of the drawings, the bow of the hook is applied to the support and the bearing block 4 together with the parts associated with it being raised are moved downwardly, thereby causing them, including the gripping member 6, to be carried forwardly toward the support, due to the forward inclination of the back arm 2. The handle arm 16 of the lever member 13 is then moved for the purpose of rotating said lever member upon the shank of the gripping member and through the medium of the cams on said lever member with the cams of the gripping member, the gripping member is carried forwardly into firm contact with the support in front of it. The support therefore becomes tightly clamped between the front and rear arms of the hook bow, and as a consequence, the hook bow is firmly held from movement. It will be readily understood that the only action necessary for the release of the hook bow is one involving the movement of the lever member in a direction the opposite to that in which it was moved to fasten the bow thereby releasing the gripping member 6 from binding contact with the support to which it was carried under the influence of the lever member.

I claim:

1. A hook comprising a bow having two arms, one of which is inclined towards the other and slotted, and clamping means slidably fitted to said inclined arm, substantially as set forth.

2. A hook comprising a bow having two arms, one of which is inclined towards the other, a binding member slidably fitted to said inclined arm, and a lever member for moving said binding member in a direction away from said inclined arm and towards the other arm, substantially as set forth.

3. A hook comprising a bow having two arms, one of which is inclined towards the other, a binding member movably fitted to said inclined arm, and a cam lever for moving said binding member, substantially as set forth.

4. A hook comprising a bow having two arms, one of which is inclined towards the other, a binding member movably fitted to said inclined arm and provided with a cam, and a cam lever for engagement with the cam of said binding member and by which said binding member is moved relative to said inclined arm.

5. A hook comprising a bow having two arms, one of which is inclined towards the other, a binding member having a shank movably fitted to said inclined arm, a block fitted to said inclined arm, and a cam member interposed between said binding member and inclined arm, substantially as set forth.

6. A hook comprising a bow having two arms, one of which is inclined towards the other, a binding member having a shank loosely fitted in said inclined arm, a block movably fitted to said inclined arm, and a cam member interposed between said binding member and block, substantially as set forth.

7. A hook comprising a bow having a depending front arm, a cross arm, and a depending back arm; one of which depending arms is inclined towards the other depending arm, and vertically movable clamping means fitted to said inclined arm, substantially as set forth.

FRED. SCHRAUDNER.

In the presence of—
  BLANCHE HOGAN,
  H. G. FLETCHER.